(12) United States Patent
Sundararajan et al.

(10) Patent No.: US 7,818,721 B2
(45) Date of Patent: Oct. 19, 2010

(54) DYNAMIC APPLICATION TRACING IN VIRTUAL MACHINE ENVIRONMENTS

(75) Inventors: Athijegannathan Sundararajan, Chennai (IN); Sanjay R. Radia, Fremont, CA (US); Sanjeev Krishnan, Bangalore (IN)

(73) Assignee: Oracle America, Inc., Redwood City, CA (US)

( * ) Notice: Subject to any disclaimer, the term of this patent is extended or adjusted under 35 U.S.C. 154(b) by 1295 days.

(21) Appl. No.: 11/344,996

(22) Filed: Feb. 1, 2006

(65) Prior Publication Data

US 2007/0180439 A1 Aug. 2, 2007

(51) Int. Cl.
G06F 9/44 (2006.01)

(52) U.S. Cl. .................................................. 717/130

(58) Field of Classification Search ................. 717/158, 717/130, 128
See application file for complete search history.

(56) References Cited

U.S. PATENT DOCUMENTS

| | | | |
|---|---|---|---|
| 6,170,083 B1* | 1/2001 | Adl-Tabatabai | 717/158 |
| 6,438,512 B1* | 8/2002 | Miller | 702/186 |
| 7,281,242 B2* | 10/2007 | Inamdar | 717/158 |
| 7,313,661 B1* | 12/2007 | Dmitriev | 711/159 |
| 7,373,290 B2* | 5/2008 | Gabele et al. | 703/21 |
| 7,398,369 B2* | 7/2008 | Dickenson | 711/170 |
| 7,424,589 B1* | 9/2008 | Pliss et al. | 711/170 |
| 2001/0047510 A1* | 11/2001 | Angel et al. | 717/4 |
| 2002/0152455 A1* | 10/2002 | Hundt et al. | 717/131 |
| 2003/0149960 A1* | 8/2003 | Inamdar | 717/118 |
| 2004/0003375 A1* | 1/2004 | George et al. | 717/124 |
| 2004/0068720 A1* | 4/2004 | Hundt | 717/158 |
| 2004/0103401 A1* | 5/2004 | Chilimbi et al. | 717/130 |
| 2004/0123279 A1* | 6/2004 | Boykin et al. | 717/158 |
| 2005/0039171 A1* | 2/2005 | Avakian et al. | 717/127 |
| 2005/0071815 A1* | 3/2005 | Mitchell et al. | 717/127 |
| 2005/0114848 A1* | 5/2005 | Choi et al. | 717/148 |
| 2005/0229165 A1* | 10/2005 | Ma et al. | 717/130 |
| 2005/0251790 A1* | 11/2005 | Hundt | 717/130 |
| 2005/0251791 A1* | 11/2005 | Hundt | 717/130 |
| 2006/0107255 A1* | 5/2006 | Chagoly et al. | 717/127 |
| 2006/0117299 A1* | 6/2006 | Goldsmith et al. | 717/124 |
| 2006/0174243 A1* | 8/2006 | Brewer et al. | 717/174 |
| 2006/0236309 A1* | 10/2006 | George | 717/133 |
| 2006/0277540 A1* | 12/2006 | Bhattacharya | 717/174 |
| 2007/0006159 A1* | 1/2007 | Hecht et al. | 717/124 |

(Continued)

OTHER PUBLICATIONS

"Solaris Dynamic Tracing Guide", Sun Microsystems, Inc., Jan. 2005, pp. 25-44, Santa Clara, California, USA.

(Continued)

*Primary Examiner*—Anna Deng
(74) *Attorney, Agent, or Firm*—Robert C Kowert; Meyertons, Hood, Kivlin, Kowert & Goetzel, P.C.

(57) ABSTRACT

A method for dynamic application tracing in virtual machine environments comprises receiving an instrumentation request that includes an identification of a probe point at which instrumentation code is to be inserted within an application. The method may further comprise making a determination whether the instrumentation code meets one or more acceptance criteria. If the instrumentation code is found to be acceptable, the method may further comprise inserting the instrumentation code at the probe point within the application while the application is executing within a virtual machine, and obtaining information indicative of application state from an execution of the instrumentation code when the probe point is reached during application execution.

19 Claims, 7 Drawing Sheets

U.S. PATENT DOCUMENTS

| | | | |
|---|---|---|---|
| 2007/0006167 A1* | 1/2007 | Luk et al. | 717/130 |
| 2007/0006177 A1* | 1/2007 | Aiber et al. | 717/136 |
| 2007/0074170 A1* | 3/2007 | Rossmann | 717/127 |
| 2007/0083856 A1* | 4/2007 | Chilimbi et al. | 717/128 |
| 2007/0168998 A1* | 7/2007 | Mehta et al. | 717/130 |
| 2007/0169052 A1* | 7/2007 | Vanrenen et al. | 717/154 |
| 2008/0005730 A1* | 1/2008 | Inamdar | 717/158 |
| 2008/0155510 A1* | 6/2008 | Zheltov et al. | 717/130 |
| 2008/0244534 A1* | 10/2008 | Golender et al. | 717/128 |

OTHER PUBLICATIONS

"Maximizing E-business Application Performance-Using JProbe and WebLogic", Sitraka, Inc., Oct. 2002, 8 pages.

"Proceedings of the Java Virtual Machine Research and Technology Symposium (JVM'01)", The USENIX Association, Apr. 23-24, 2001, pp. 1-11, Monterey, California, USA.

"PerformaSure-Performance Diagnostics-Part of the Quest Software APM Suite for J2EE", Quest Software, Inc., 2005, 2 pages, Irvine, California, USA.

"AppPerfect Java Profiler-Java Testing and Monitoring Solutions", AppPerfect Corporation, 2002-2005, 3 pages.

Sun Microsystems, Inc., "Tool Report: Borland Optimizeit Enterprise Suite," Oct. 2003, 15 pages.

"Jstat-Java Virtual Machine Statistics Monitoring Tool", Sun Microsystems, Inc., 2003.

Sun Microsystems, Inc., "JavaOne: Using jvmstat and Visualgc to Solve Memory Management Problems," 2004 JavaOne Conference, Sessions TS-2428, 35 pages.

\* cited by examiner

DYNAMIC APPLICATION TRACING IN VIRTUAL MACHINE ENVIRONMENTS

BACKGROUND OF THE INVENTION

1. Field of the Invention

The present invention is directed to computer systems. More particularly, it is directed to dynamic tracing mechanisms for computer system applications.

2. Description of the Related Art

The complexity and cost of developing, testing and deploying enterprise-level computer systems applications has been increasing rapidly. In order to reduce overall cost and complexity, many modern enterprise-level computer systems applications are written in platform-independent languages such as the Java™ language supported by Sun Microsystems, and are deployed for execution at virtual machine environments, such as Java Virtual Machines (JVMs) implemented within a variety of J2EE™ (Java 2 Enterprise Edition) compliant application servers from different vendors. By choosing platform-independent programming languages, for example, application vendors may reduce development and porting costs and reduce their reliance on specific hardware vendors and operating systems vendors. In addition, by take advantage of built-in application server features such as transaction support, messaging services, etc., application vendors may also be able to reduce the amount of new code that has to be developed for each new application.

While the use of virtual machines and platform-independent languages provides several advantages for enterprise applications, serviceability and observability mechanisms for such applications have not yet reached a desired level of maturity and sophistication. The terms serviceability and observability may refer to a variety of maintenance-related capabilities, including, for example, the ability to obtain runtime information from a running application, such as performance characteristics, the values of key attributes, and troubleshooting and diagnosis information useful in to resolving perceived problems. While numerous tools and techniques have been developed over the years to analyze different aspects of the behavior of computer systems applications, existing tools and techniques typically fail to provide a comprehensive package of services sufficient to diagnose and resolve a variety of application problems at run time in virtual machine environments, and several of the existing techniques may result in undesirable side effects and/or unacceptable overhead.

Many performance tools and analysis techniques are platform specific, for example, and may not be useful for analyzing application state (e.g., by obtaining values of programming constructs such as variables defined in a platform-independent programming language like Java™) within virtual machines. Some performance tools support monitoring of applications deployed within virtual machine processes, but may require that the virtual machine processes be restarted (often with a changed execution environment such as a modified class path) in order to enable monitoring. While such tools may be useful in development environments, they may be insufficient for diagnosing problems in production environments, where requiring mission-critical applications to be restarted for problem diagnosis may not be feasible. In addition, many performance and/or debug tools may impose a high performance overhead: that is, monitored applications may run substantially slower than unmonitored applications, even when portions of the application that may be unrelated to the cause of a perceived performance problem are being executed. Furthermore, many performance tools may allow only a relatively small set of predefined types of monitoring actions to be performed (e.g., only monitoring of memory usage and/or CPU usage may be supported). In contrast to the limited monitoring support provided by some performance tools, other techniques such as "aspect-oriented programming (AOP)" may allow unrestricted and potentially unsafe modification of application code (e.g., by inserting arbitrary code within an application, including code which may modify application state or may loop forever). Such unrestricted modification of applications may result in unpredictable or undesired behavior such as data corruption, application hangs or crashes, and the like.

SUMMARY

Various embodiments of methods and systems for dynamic application tracing in virtual machine environments are disclosed. According to one embodiment, a method may comprise receiving an instrumentation request that includes an identification of a probe point at which instrumentation code is to be inserted within an application. The probe point may, for example, identify a particular location within a method of an executable class included within the application, or one or more locations within a set of methods of a set of application classes, etc. The instrumentation code may be included in the instrumentation request in some embodiments, e.g., in an intermediate file format from which an executable version may be derived. The method may further comprise dynamically inserting the instrumentation code at the probe point within the application while the application is executing within a virtual machine process, and obtaining information indicative of application state (e.g., a value of an application variable) from an execution of the instrumentation code when the probe point is reached during application execution.

In some embodiments, the method may further comprise verifying that the instrumentation code meets one or more acceptance criteria prior to inserting the instrumentation code into the application. For example, the instrumentation code may be considered unacceptable if it attempts to modify the state of the targeted application, or includes programming constructs such as loops which may potentially lead to unbounded execution times, etc.

The instrumentation code may be derived at least in part from a user-supplied instrumentation program or script in some embodiments. The script may be compiled into intermediate file format at a client tool, included in the instrumentation request sent to an instrumentation agent at the targeted virtual machine, and converted to executable form by the agent at the targeted virtual machine. The application may not have to restarted, and the execution environment of the application (e.g., class path settings etc.) may not have to altered, to support the instrumentation. By allowing arbitrary user-specified instrumentation code that has been checked for acceptability to be inserted dynamically at selected locations within user applications, a flexible, safe and low-overhead instrumentation framework may be supported. For example, the framework may support troubleshooting of selected portions of running production applications without significantly affecting the overall performance or behavior of the production applications (e.g., by limiting the impact of instrumentation to the selected portions of application code). No build-time or deploy-time changes may be needed for the targeted application, and instrumentation may be dynamically turned on and off on demand.

In one embodiment, where for example the instrumented applications are implemented using a platform-independent programming language such as Java™, the instrumentation script or program may be written by a user in a platform-independent instrumentation language, e.g., in a language called JTrace. The instrumentation language may be modeled on the application programming language, e.g., it may include similar programming constructs as the application programming language to allow programmers and analysts to easily generate instrumentation scripts. Programs or scripts written in the platform-independent instrumentation language may be portable, i.e., the scripts may be used without modification to instrument applications at a variety of virtual machines running on different hardware platforms.

A number of different categories of instrumentation sources (which may be called probe providers) may be specified using the instrumentation language in various embodiments. For example, language-level probe providers may allow probe points to be identified using class names, method names, and locations within methods (e.g., on entry to a specified method, on exit from a specified method, etc.) of the targeted application. Profiling-based providers may be supported in some embodiments to support timer-based instrumentation or trend analysis, e.g., to obtain the value of a particular application variable or field at specified time intervals, or to identify the methods or classes that consume the most processing cycles. Logical probe providers, which may be associated with abstract operations such as "Start Transaction", "Start Web Application", etc., may be supported in some embodiments. Before the corresponding instrumentation code is inserted into the application, logical probes (i.e., probe points associated with logical probe providers) may be mapped or translated into physical or language-level probes identifying the specific classes/methods where the corresponding abstract operations are implemented within the application.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Figure 1:
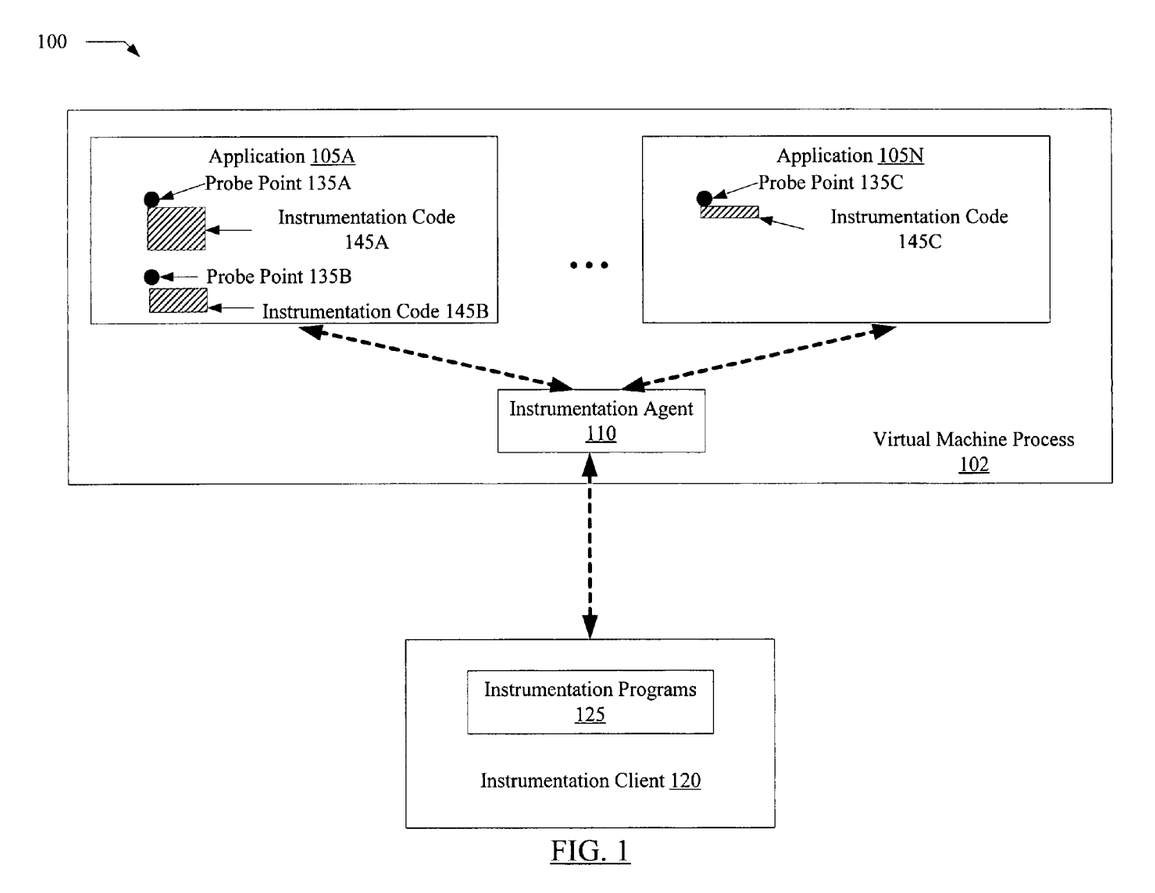
FIG. 1 is a block diagram illustrating one embodiment of a system.

FIG. 1 is a block diagram illustrating one embodiment of a system 100. The system comprises a virtual machine process 102 within which one or more applications 105A-105N (collectively, applications 105) and an instrumentation agent 110 are being executed, and an instrumentation client 125. The instrumentation agent 110 may be configured to receive an instrumentation request from the instrumentation client 125, wherein the instrumentation request comprises an identification of one or more probe points 135 within an application 105 at which instrumentation code 145 is to be inserted within the application. For example, the instrumentation request may identify probe point 135A of application 105A at which instrumentation code 145A is to be inserted, probe point 135B of application 105A at which instrumentation code 145B is to be inserted, and/or probe point 135C of application 105C at which instrumentation code 145C is to be inserted. In some embodiments, a single request may be used to request the instrumentation of multiple applications 105: e.g., all three probe points shown in FIG. 1 may be identified using a single request from instrumentation client 125. The instrumentation code 145 (e.g., 145A, 145B or 145C) may be derived by instrumentation agent 110 from the contents of the instrumentation request (e.g., by converting from an intermediate format to executable byte code format) in some embodiments, and may be included within the instrumentation request in executable format in other embodiments.

In response to the instrumentation request, in some embodiments instrumentation agent 110 may be configured to make a determination whether the instrumentation code 145 meets one or more acceptance criteria. For example, as described below in further detail, in some embodiments, instrumentation code 145 may be checked to ensure that it does not attempt to modify application state, to ensure that it does not contain any of a set of prohibited programming constructs such as loops that may potentially lead to unbounded execution times, etc. Each portion of the instrumentation code (e.g., portion 145A, 145B and/or 145C) within a given instrumentation request may be checked independently for acceptability in some embodiments. If a particular portion of instrumentation code such as 145A meets the acceptance criteria, instrumentation agent 110 may be configured to insert the instrumentation code 145A at the corresponding probe point 135A within application 105A while the application 105A is being executed within the virtual machine process 102. (It is noted that the terms "virtual machine" and "virtual machine process" may be used synonymously herein.) It is noted that in some embodiments, instrumentation agent 110 may be configured to insert the instrumentation code 145 into the application 105 without explicitly checking for acceptability. Thus, instrumentation agent 110 may instrument user-mode code of running applications 105 within a virtual machine process, without, for example, restarting the virtual machine process, changing runtime environment settings such as class path parameters for the virtual machine process, requiring any build time or deployment time changes to the application, etc. The ability to instrument running applications may be particularly useful in production environments, where customers may be reluctant to stop and restart critical applications and/or to modify runtime environment settings. Furthermore, since instrumentation code 145 may be inserted only at specified probe points within applications 105, the overhead of instrumentation may be limited to a small subset of the application that is of interest, and the effects of instrumentation on overall application execution may be minimized. Depending on the contents of the instrumentation code 145, various types of information about the application 105, including for example application state information, may be obtained if and when the inserted instrumentation code 145 is executed (e.g., when the corresponding probe point 135 is reached during application execution). Further details regarding the specification of probe points 135, the acceptance criteria that may be employed, and the different types of information that may be obtained using instrumentation code 145 in various embodiments are provided below.

The information obtained as a result of the instrumentation may be provided to the instrumentation client 120, e.g., either directly from the application 105 or indirectly via the application agent 110. The information may be provided simultaneously to more than one instrumentation client 120 in some embodiments. In some embodiments, additional support for long running sessions may be provided by instrumentation agent 110. For example, the instrumentation client 120 may be allowed to connect to the instrumentation agent 110, send one or more instrumentation requests, and disconnect. In response to the request or requests, the instrumentation agent 110 may be configured to verify the acceptability of the instrumentation code 145 and instrument the running application 105. The instrumentation results (e.g., the output of the instrumentation code 145) may be accumulated at the agent 110, and provided to the instrumentation client 120 when the instrumentation client eventually reconnects to the instrumentation agent 110 (e.g., after a number of hours or days). Instrumentation agent 110 may be configured to support multiple concurrent instrumentation sessions, e.g., to instrument one or more applications (or different portions of the same application) on behalf of a plurality of instrumentation clients 120 concurrently.

In one embodiment, at least a portion of the instrumentation code 145 may be derived from a user-generated instrumentation script or program written in an instrumentation programming language. The terms "instrumentation script" and "instrumentation program" may be used synonymously herein. A user may prepare one or more instrumentation programs 125 in the instrumentation programming language to instrument an application 105, for example in response to a perceived detection of a performance problem within the application, or to diagnose and analyze unexpected application behavior, etc. Portions or all of instrumentation programs 125, e.g., in an intermediate file format as described below and/or in source code format, may be included within the instrumentation requests sent to the instrumentation agent 110 from application client 120 in some embodiments. The instrumentation programming language may support a variety of programming constructs, such as the ability to define variables of local or global scope, conditional ordering of instrumentation code, etc., allowing users to generate arbitrarily complex instrumentation programs 125.

Figure 2:
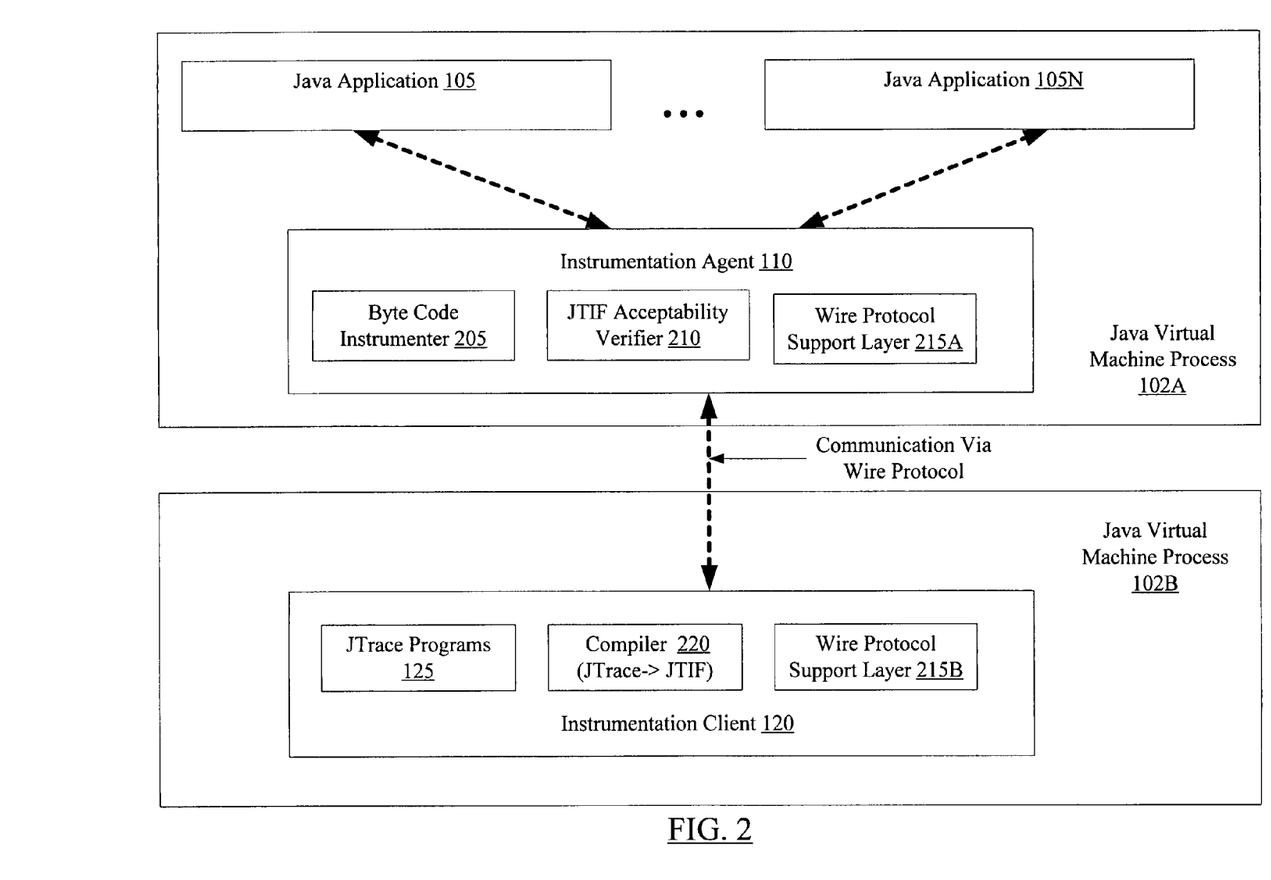
FIG. 2 is a block diagram illustrating an embodiment where an instrumentation agent may be executed within a first virtual machine process, and an instrumentation client may be executed within a second virtual machine process.

FIG. 2 is a block diagram illustrating an embodiment where instrumentation agent 110 may be executed within a first Java™ virtual machine (JVM) process 102A, and instrumentation client 120 may be executed within a second JVM process 102B. In the depicted embodiment, applications 105A-105N may be written in a platform-independent programming language such as Java™, and instrumentation programs 125 may be implemented using a platform-independent instrumentation language called JTrace. Instrumentation client 120 may include a compiler 220 to parse and convert JTrace programs or scripts into a file format called JTrace Intermediate File Format (JTIF), as well as wire protocol support layer 215B for communication with instrumentation agent 110. Instrumentation agent 110 may be implemented, for example, using the Java Virtual Machine Tool Interface (JVMTI) standard, and may include a JTIF acceptability verifier 210, a byte code instrumenter 205, and a wire protocol support layer 215A to communicate with instrumentation client 120. In some embodiments JVMs 102A and 102B may be executed within the same physical computer host, while in other embodiments, JVM 102A and 102B may be executed at different computer hosts linked by a network. In one embodiment, at least one of the JVMs 102 may be executed within an application server, such as a J2EE™-compliant application server. Any appropriate protocol may be used for communication between instrumentation client 120 and instrumentation agent 110, such as a secure protocol built on top of sockets (e.g., a protocol supporting Secure Sockets Layer (SSL) encryption), shared memory (e.g., in an embodiment where JVMs 102A and 102B are executed at the same host), and various other protocols that may be based on the Internet Protocol (IP), the User Datagram Protocol (UDP), etc.

In the embodiment of FIG. 2, instrumentation client 120 at JVM 102B may be configured to obtain a JTrace instrumentation program 125 (e.g., from a user, or from a library of existing JTrace programs specified by a user), compile the JTrace program into JTIF using compiler 220, and send the JTIF version of the instrumentation program as part of an instrumentation request to instrumentation agent 110 at JVM 102A. When the request is received at the instrumentation agent 110, in some embodiments JTIF acceptability verifier 210 may be configured to determine whether the JTIF version is acceptable according to one or more acceptability criteria. For example, in one embodiment, the JTIF version may be deemed to be unacceptable if it includes a write operation that modifies application state, or if it includes a loop or some other programming construct that may potentially result in blocking or in unbounded execution time for the instrumentation code 145. In one embodiment, method calls may be considered unacceptable, with the exception of built-in methods/functions supported by the instrumentation language. It is noted that not all write operations may result in a determination of unacceptability in some embodiments: e.g., in one embodiment, a modification of a variable defined within the JTrace program 125 may be considered acceptable, but a modification of a variable that is defined in the application 105 may be considered unacceptable. In some embodiments, the acceptability criteria may be configurable, and may, for example, be specified via input parameter settings to instrumentation agent 110. For example, input parameter settings may be used to identify a set of acceptable method calls within the instrumentation code in one embodiment. In one embodiment, the verification of acceptability may itself be optional: e.g., it may be possible for a user to enable and/or disable acceptability verification by instrumentation agent 110.

In some embodiments, byte code instrumenter 205 may be configured to instrument the byte code of the Java™ application 105 designated as an instrumentation target in the instrumentation request. In one embodiment, if the JTIF version is determined to be unacceptable, instrumentation agent 110 may be configured to send an error indication to instrumentation agent 120, which may indicate the specific reasons or causes that led to the determination of unacceptability in some embodiments. In some embodiments, the acceptability or safety of the instrumentation code may be checked at more than one level within the instrumentation framework depicted in FIG. 2. In one such embodiment, the instrumentation language (such as JTrace) itself may disallow certain classes of unsafe operations to be specified, so that, for example, some unsafe or disallowed operations may be caught and flagged as errors by compiler 220. In addition, prior to inserting instrumentation code into an application 105, JTIF acceptability verifier 210 may perform a second set of checks to prevent any undesirable changes to application state, application hangs, etc. that may potentially be introduced as a result of instrumentation.

Byte code instrumenter 205 may be configured to instrument applications 105 using a variety of techniques in different embodiments. For example, in some embodiments, the application modification technique used for instrumentation may depend on when during the execution of an application 105 the instrumentation request is received from instrumentation client 120. The specific Java™ classes that include probe points 135 may be specified in the JTrace programs (and in the corresponding JTIF versions) in some embodiments, as described below in further detail in conjunction with the description of FIG. 3. If the instrumentation request is received before a targeted class that is to be instrumented is loaded into memory for execution, byte code instrumenter 205 may be configured to ensure that an instrumented version of the byte code of the targeted class is loaded into memory, e.g., by the appropriate class loader. If the instrumentation request is received after the targeted class is already loaded, a technique called "hotswap" or "class redefinition" may be used instead, wherein the in-memory executable code of the targeted class is replaced by an instrumented version. Thus, the executable code of the application 105 may be modified for instrumentation prior to being loaded, at load time, or after being loaded in various embodiments. In some embodiments where the JVM 102 in which application 105 is executing is configured to compile long-running or frequently-executed byte code into native code (i.e., into hardware platform-specific instructions) for faster execution, instrumentation code 145 that happens to be executed frequently and/or over extended periods may also be compiled automatically into native code.

Figure 3:
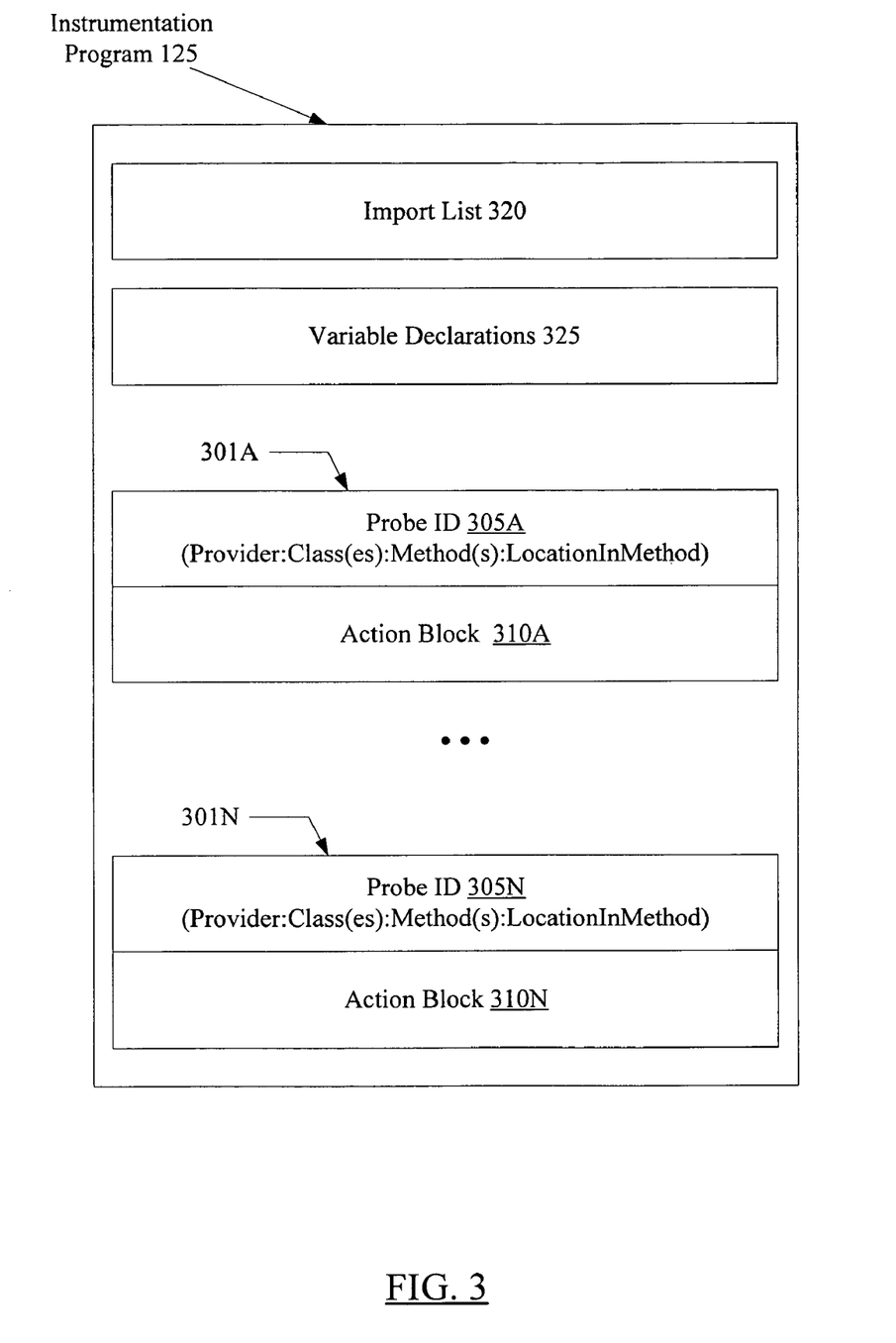
FIG. 3 is a block diagram illustrating an exemplary organization of a JTrace instrumentation program, according to one embodiment.

An instrumentation program 125 such as a JTrace program (which may also be referred to herein as a JTrace script) may comprise a plurality of sections, where at least one section includes an identification of a probe point 135 and instrumentation actions to be performed at the probe point. The specific instrumentation language that is used to instrument applications 105 may be designed to be easily understood and familiar to the programmers that developed the applications 105—e.g., if the applications are written in a given programming language (e.g., Java™), the instrumentation language (e.g., JTrace) may implement a syntax and programming constructs that are similar to those of the given programming language. FIG. 3 is a block diagram illustrating an exemplary organization of a JTrace instrumentation program 125 according to one embodiment. As shown, the instrumentation program 125 includes an import list section 320, a variable declaration section 325, and a plurality of probe clause sections 301A-301N, where each probe clause section 301 comprises a respective probe identifier (probe ID) 305 and a respective action block 310. The action block 310 may represent a JTrace version of the instrumentation code 145 to be executed when an execution of the application 105 reaches the probe point identified by the corresponding probe ID 305. Examples of several simple probe clause sections 301 are provided below.

Import list section 320 may be used to specify one or more import declarations (e.g., "import java.net.*") identifying classes or packages whose objects may be referred to within the instrumentation program 125. In one embodiment, for example, the import declarations may allow probe identifiers 305 and/or action blocks 310 to refer to instrumented classes (e.g., classes from a "java.net" package in the above example, such as "java.net.URLClassLoader") using shortened names (such as "URLClassLoader"), instead of using the fully-qualified names of the classes. Variable declaration section 325 may be used to declare local, global, and/or thread-local variables for use in the instrumentation program 125. Import list section 320 and variable declaration section 325 may be optional in some embodiments. A probe ID 305 may be specified as a combination of several elements or fields in some embodiments: e.g., a provider field, a class field, a method field, and a "Location_In_Method" field. A provider field may represent a category of instrumentation information sources. For example, in one implementation, in order to obtain application state information from programming language constructs such as classes, methods, variables, etc., a "language-level" probe provider (such as a "java.lang" probe provider in an embodiment where applications are written in Java™) may be specified in a provider field. Application state information such as the values of application variables and/or the state of other instances of various programming constructs may be obtained using language-level probe providers. In order to obtain timer-based profiling information (such as how CPU usage was distributed among specific portions of an application program) a "profile" probe provider may be specified. Language-level probe providers, profile probe providers and one or more other probe providers may be supported by default by the instrumentation language such as JTrace, and may be termed "default" providers or "physical" providers in some embodiments.

In some embodiments, a probe ID may include a specification of an "abstract" or "logical" probe provider, where the logical probe provider represents instrumentation information sources that are not tied to a particular language construct or associated with a built-in provider supported by the instrumentation language. Logical probe providers may be used to specify probe points associated with operations or events identified at an abstract level, such as "Start J2EE Transaction", "End J2EE Transaction", "Start Garbage Collection", "End Garbage Collection", "Start Web Application", etc., where the implementation of the operation or event may differ from one JVM or application server to another. A probe ID 305 whose provider field includes a logical operation name (e.g., "webAppStarted") may be translated into a physical probe ID (e.g., into a probe ID that identifies the specific class being used to implement the corresponding logical operation in the current JVM 102) using a translation table in some embodiments. For example, a standard set of logical probe provider names and/or logical operation names may be provided to different application server vendors, database vendors, etc., and each vendor may supply a translation table to instrumentation agent 110 indicating a mapping between the logical provider names and operations and the specific classes being used by the vendor or vendors to implement the logical operations. That is, each vendor may provide a mapping mechanism such as a table to translate the name of the logical operation to a location of an instruction or byte code within an executable version of the application as implemented by that vendor, where an execution of the instruction corresponds to an initiation of the logical operation. In some embodiments, hierarchies of logical probe providers may be supported, with mappings used to translate between the different layers; e.g., a first logical probe provider at one level of the hierarchy may be mapped to a second logical probe provider at another level, and the second logical probe provider may be mapped to a physical probe provider to identify the location at which instrumentation code is to be inserted.

The use of logical probe providers may help increase the portability and stability of instrumentation programs 125, since the instrumentation programs may be re-used without modification in a variety of execution environments such as application servers from different vendors, as long as the mapping information translating the logical operations to classes/methods is available for each execution environment. In some embodiments, a service provider interface (SPI) may be supported, which allows users to communicate with a logical probe provider and obtain a list of supported logical probe points and/or the mapping between supported logical probe points and physical probe points or existing logical probe points. Using such an SPI, users may plug in additional logical probe points into their JTrace scripts as needed.

In some embodiments, source code annotation may be used to perform the translation, instead of or in addition to translation tables: e.g., a vendor may annotate the vendor-specific code at an appropriate point with the name of a standard logical provider using an agreed-upon format (e.g., within a comment section), and instrumentation agent 110 may be configured to use the annotation to map the logical provider name to a class names. For example, if a particular application server vendor implements the beginning of a J2EE transaction using a method called "xyz.j2eetransaction.start( )", the particular application server vendor may include a comment such as "/** logicalProbeProvider: J2EE_Transaction_Start */" immediately before the code of the "xyz.j2eetransaction.start( )" method. If, in this example, instrumentation agent 110 receives a request to insert instrumentation code corresponding to an action block 310 at a probe point associated with a logical probe provider called "J2EE_Transaction_Start", the comment may be used to identify where the code is to be inserted. In some embodiments, the comments related to logical probe providers may be inserted in a format compatible with other common uses of comments for metadata, e.g., in a format similar to that used for "javadoc" tags for generating documentation. In other embodiments, other annotation techniques may be used, such as the annotation mechanisms supported in Java™ 5.0 (where, for example, an annotation may comprise an "@" sign followed by an annotation type and a parenthesized list of element value pairs).

The class field of a probe ID 305 may be used to specify one or more classes associated with the probe provider identified in the provider field. For example, a specific class may be named (e.g., "ClassLoader", "StringBuffer") in the class field, or a set of classes may be specified using one or more wild card characters. Similarly, the method field may be use to specify one or more methods to be instrumented within the class. The Location_In_Method field may be used to specify where in or around a method the instrumentation code is to be inserted, e.g., immediately after entering the method, immediately prior to exiting the method, before and after calling the method, etc. It is noted that in some embodiments, one or more probe IDs 305 within an instrumentation program 125 may include fewer or more fields than the four fields described above (i.e., provider fields, class fields, method fields, and Location_In_Method fields). In some implementations, the location of a probe point may also be specified using line numbers of the source code of the targeted application: e.g., instead of identifying a method by name, the method may be identified by its source code line number or numbers.

The action block 310 may be used to specify the specific operations that are to be implemented in instrumentation code 145. Action blocks 310 may include built-in functions and primitives supported by the instrumentation language and/or invocations of various methods that may have been imported using the import list section 320 in some embodiments. Four examples of probe clauses that may be included within JTrace scripts (e.g., JTrace probe IDs 305 and associated action blocks 310) are provided below.

Example 1

```
java.lang: ClassLoader: loadClass: entry {
    jstack( );
}
```

The probe ID 305 in Example 1 consists of four colon-separated fields: provider field java.lang, class field ClassLoader, method field loadClass, and Location_In_Method field entry. The probe clause of Example 1 indicates that upon entry to a loadClass method of a ClassLoader class associated with provider java.lang, a built-in JTrace function called jstack( ) (the action block 310) is to be executed. The jstack( ) function may provide a listing of a Java-level stack trace of the traced JVM 102A whenever a new Java class is loaded by the ClassLoader in JVM 102A. The probe clause of Example 1 may be used to identify calling sequences—e.g., if a particular class C1 is suspected to be the cause of some unexpected behavior or performance slowdown, a user may use the probe clause of Example 1 to identify which other methods/classes of an application 105 led to class C1 being loaded. In addition to or instead of jstack( ), a variety of other built-in functions to support frequently-performed analysis tasks may be provided in various embodiments, e.g., a built-in function called currentThread( ) may be sued to identify the currently executing thread.

Example 2

```
java.lang: ? extends java.io.InputStream : read: entry {
    print("input stream read");
}
```

The probe ID 305 in Example 2 also consists of four colon-separated fields: provider field java.lang, class field "? extends java.io.InputStream", method field read, and "LocationInMethod" field entry. In Example 2, the wild card character ("?") within the class field serves as an indicator that instrumentation code corresponding to the action block 310 (print("input stream read")) is to be inserted into any of a plurality of classes that may extend the class java.io.InputStream. As a result on instrumentation performed according to Example 2, trace message "input stream read" may be printed out whenever a read method of any such class is entered. Similar wild cards may also be used in one or more other fields of probe IDs 305 (e.g., in method fields and/or in Location_In_Method fields) in some embodiments. As shown in Example 2, JTrace may allow groups or categories of classes and/or methods to be instrumented using relatively short and simple probe clauses, thus greatly enhancing the flexibility and usability of application instrumentation.

Example 3

```
java.profile: 5000 {
    print(com.acme.cacheManager.cacheCount);
}
```

The probe ID 305 of Example 3 consists of just two fields: the name of the provider (java.profile) and a profiling frequency (5000) expressed in a default time unit such as milliseconds. The java.profile probe provider may be used to perform statistical profiling using timer-based sampling techniques, e.g., to identify trends such as the methods of an application 105 in which the most processing time is being spent, the number of threads typically waiting for a lock, etc. The probe clause of Example 3 indicates that the value of a static field (com.acme.cacheManager.cacheCount) of an application-defined class (com.acme.cacheManager) is to be printed out once every 5000 time units, thus allowing a user to determine how the value of that static field varies over time. In some embodiments, the probe ID 305 for a profiling probe provider may include additional fields, such as a specification of a non-default time unit (e.g., a probe ID such as "java.profile: 500: microseconds" may be used to indicate that the action of the action block is to be performed once every 500 microseconds).

Example 4

```
j2ee.webapp: webAppStarted (String webAppURL) {
    print("Starting Web application:" + webAppURL);
}
```

Example 4 shows a logical probe provider j2ee.webApp corresponding to J2EE web applications, and a logical probe point name (webAppStarted) associated with the abstract operation of starting the web application. As described above, the logical probe point may be mapped in different J2EE-compliant application servers to different classes, e.g., using mapping tables and/or annotation. As shown, the Universal Resource Locator (URL) of the web application to be instrumented may be passed as string parameter webAppURL. Any appropriate instrumentation actions may be inserted in the action block 310 of a logical probe clause—e.g., actions that are generically applicable for web applications, such as a printing of a message indicating that the web application has started, as in Example 4, or actions that may be specific to one or more specific web applications (e.g., based on a conditional clause such as "if (webAppURL.contains ("acme")").

It is noted that an instrumentation language such as JTrace may support a wide variety of other features in addition to, or instead of, the features shown in Examples 1-4 above. For example, in one embodiment, a built-in function called filterClasses( ) that accepts a class loader object (e.g., "abc.def.ClassLoader") as a parameter may be supported. After the filterClasses( ) function is called within an instrumentation program 125, subsequent instrumentation of application byte code may be restricted to classes initialized by the specified class loader. Another built-in function, e.g., probeClassLoader( ), may be used in some embodiments to identify the class loader that loaded the currently instrumented class, i.e., the class in which the probe clause containing the probeClassLoader( ) call is located. Various additional utility functions, such as functions to identify the current thread, may be supported in different embodiments. In some embodiments, the instrumentation language may be extensible—i.e., it may provide a set of built-in classes and interfaces as part of a standard specification, and virtual machine vendors and/or users may be allowed to extend the built-in classes and interfaces. The formal syntax of the instrumentation language may be provided in the form of a BNF (Backus-Naur Form) representation included within a standard specification in some embodiments. In addition to language-level probe providers, profile probe providers, and logical probe providers, in some embodiments an additional "self-instrumentation" provider that allows instrumentation of the instrumentation program 125 may also be supported.

As noted above, in some embodiments, a compiler 220 may be configured to parse and compile an instrumentation program 125 into an intermediate file format such as JTIF (JTrace Intermediate File Format). In one embodiment, the intermediate file format used for the instrumentation code may be similar to, or based on, an intermediate file format that may be used for executable versions of classes of applications 105 that are written in a platform-independent language, such as the Java Class File Format used for storing class files of Java applications. For example, a JTIF file may, in one embodiment, be implemented as a JTraceFile structure comprising the following fields:

```
JTraceFile {
    u4 magic;
    u2 jtrace_minor_version;
    u2 jtrace_major_version;
    u2 class_minor_version;
    u2 class_major_version;
    u2 constant_pool_count;
    cp_info constant_pool[constant_pool_count - 1];
    u2 script_variable_count;
    script_variable_info variables[script_variable_count]
    u2 probe_clause_count;
    probe_clause_info probes[probe_clauses_count];
    u2 attributes_count;
    attribute_info attributes[attributes_count];
}
```

The type fields u4 and u2 within the JTraceFile structure may indicate unsigned 4-byte and 2-byte quantities, respectively. The magic field may be a special string identifying the following fields as being a JTraceFile structure. Various version fields (e.g., jtrace_minor_version, jtrace_major_version, class_minor_version, and class_major_version) may be used to identify the versions of specifications or standards with which the JTraceFile and/or the byte code of the class instrumented by the JTraceFile structure are compliant. A constant_ pool array may be used to represent string constants, class and interface names, field names, and other constants that are referred to within the JTraceFile structure and its substructures, and an attributes array may be used to store various attributes associated with the JTraceFile structure. The variables array may be used to store information related to variables defined and/or used in the JTrace instrumentation program 125 represented by the JTraceFile structure (such as variable names, access flags, scope, permissions etc. associated with each JTrace variable), and the probes array may be used to store the names of probe providers and provider-specific attributes for each probe clause in the instrumentation program 125. Each probe clause may have an associated "Code" attribute representing a byte code version of the action block 310 of the probe clause. In some embodiments, the byte code for a JTrace action may include one or more JTrace-specific extension byte codes in addition to regular JVM byte codes.

A variety of different attributes may be supported for probe clauses corresponding to different probe providers in some embodiments. For example, for language-level providers such as java.lang, ProbeClass attributes and ProbeMethod attributes may represent the class and method fields of probe IDs 305, respectively. In addition, probe point attributes may be used to specify the precise location at which the instrumentation code for the probe clause (identified by the "Code" attribute in the JTraceFile structure) is to be inserted. For language-level providers, exemplary probe point attributes may include ExceptionCatch, ExceptionThrow, FieldGet, FieldSet, MethodCall, MethodEntry, MethodReturn, and SourceLine attributes. Each probe clause attribute may be represented by a corresponding data structure that may include, for example, pointers to other substructures of the JTraceFile structure, such as the attributes array, the constant_ pool array, etc. An ExceptionCatch attribute may be associated with instrumentation code to be executed when an exception is caught, and an ExceptionThrow attribute may be associated with instrumentation code to be executed when an exception is thrown. FieldGet and FieldSet attributes may be associated with instrumentation code to be executed when the value of a field of the class is obtained (read) and set (written), respectively. MethodCall, MethodEntry and MethodReturn attributes may be associated with instrumentation code to be executed when a method is called, on entry to a method, and on return from a method, respectively. SourceLine attributes may be associated with instrumentation code to be executed when code corresponding to a specified source line of an application program is reached during execution. For providers other than language-level providers, other attributes may be supported, such as a ProfileInterval attribute associated with a java.profile provider, indicating a sampling interval for the action block of the corresponding probe clause. A LogicalProbe attributes may be supported for logical provider probes, identifying, for example, the name and/or signature of the logical probe. In addition to the attributes for language-level probe providers, profile probe providers, and logical probe providers, in some embodiments additional JTIF attributes for a self-instrumentation probe provider (such as ExceptionCatch, MethodEntry and MethodReturn attributes) may also be supported.

The compiled instrumentation code in intermediate file format (e.g., JTIF) may be sent to instrumentation agent 110 and verified for compliance with one or more acceptability criteria, e.g., by JTIF acceptability verifier 210. In one embodiment, the overall goals of the verification process may be to ensure that the instrumentation code is safe and that the instrumentation code has minimal performance impact. The verification may ensure, for example, that the instrumentation code does not modify application variables (e.g., by assigning a value to a variable defined in the application code) or application state, and that the instrumentation code is bounded in execution time. Operations such as loops (which may, at least potentially, run for extended periods of time), and potentially blocking operations such as lock requests, method calls, monitors, etc., may be considered unacceptable in some embodiments. In some embodiments, the types of verification operations to be performed may be configurable—e.g., in one implementation, a user may specify via a parameter setting that certain types of method calls (such as "get" methods to obtain values of class fields) are to be considered acceptable within the instrumentation code. If the intermediate file format version of the instrumentation code includes extended byte code, in some embodiments the extended byte code may be converted by verifier 210 to standard or normal byte code for the target JVM 102A. By using standard byte code, instrumentation code may be provided at least the same level of safety that is provided by the JVM for application code (e.g., the ability to avoid null pointer errors, segmentation violations, etc.)

It is noted that in some embodiments, languages other than Java™, virtual machines other than JVMs, instrumentation languages other than JTrace, and/or intermediate file formats other than JTIF may be utilized while supporting the same general functionality described above in conjunction with the description of FIG. 1-FIG. 3. In addition, some of the specific features supported by the instrumentation framework described above, such as the ability to use wild cards when specifying probe points, may not be supported in some embodiments, while additional specific features not described above may be supported. In one embodiment, for example, the instrumentation language may support interfaces allowing cooperation with other instrumentation sources such as operating-system level profilers trace tools, hardware analysis tools, etc., so that instrumentation for a more comprehensive execution stack (e.g., including not just application software layers, but one or more operating system layers and/or hardware layers as well) may be obtained. In one embodiment, some of the instrumentation actions (e.g., action blocks 310) may be dynamically substituted by other instrumentation actions at run time, for example without affecting the code at the calling probe point.

Figure 4:
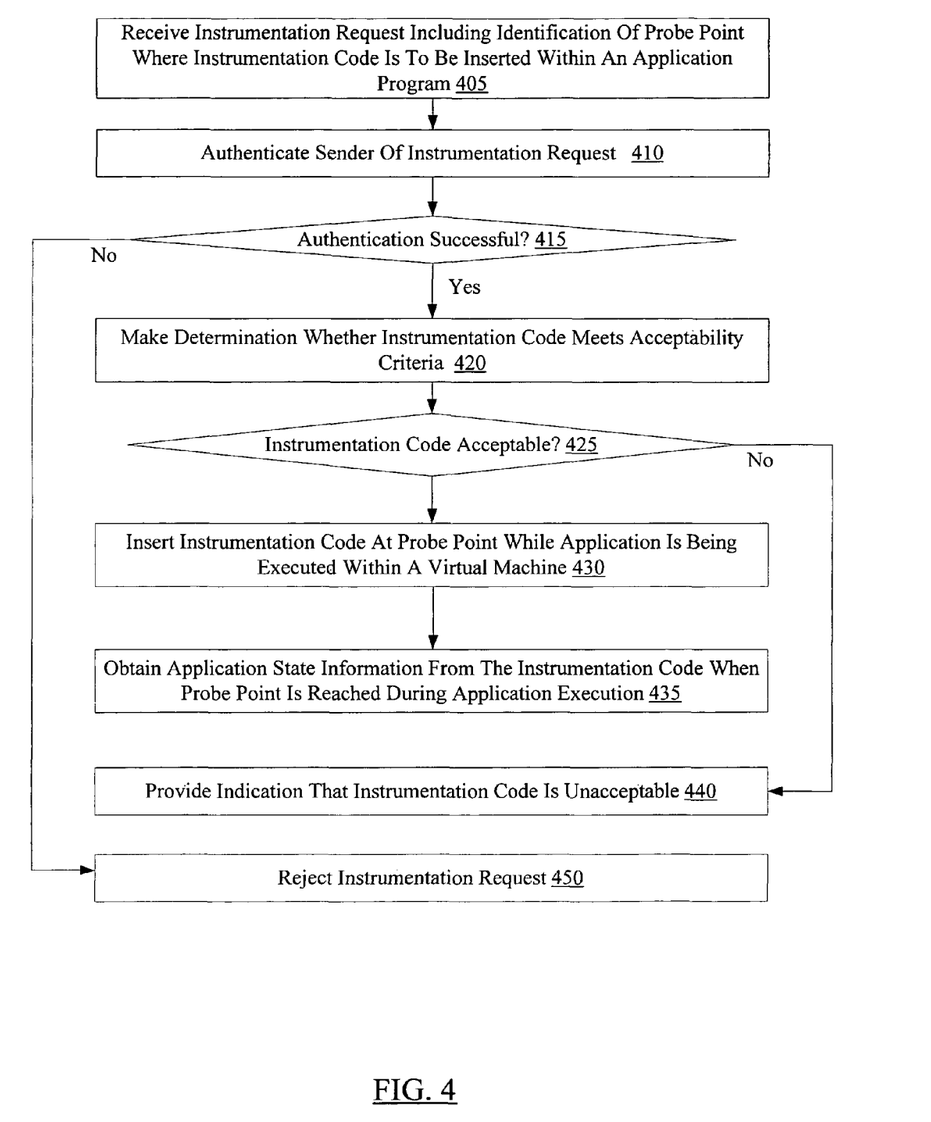
FIG. 4 is a flow diagram illustrating aspects of the operation of an instrumentation agent, according to one embodiment.

FIG. 4 is a flow diagram illustrating aspects of the operation of instrumentation agent 110, according to one embodiment. The instrumentation agent 110 may be configured to receive an instrumentation request that includes an identification of a probe point 135 where instrumentation code 145 is to be inserted within an application 105 (block 405 of FIG. 4). For example, a user who wishes to diagnose a perceived performance problem in the application 105, such as a slower-than-expected throughput or longer-than-expected response times, may decide to analyze the application's behavior using the dynamic tracing techniques described above. The user may interact with the instrumentation framework using instrumentation client 120, e.g., using a command-line interface or a graphical user interface or GUI to specify an instrumentation program 125 in a language such as JTrace. Instrumentation client 120 may be configured to send the instrumentation request to instrumentation agent 110 on behalf of the user. As noted earlier, in some embodiments the instrumentation program 125 may be parsed and/or compiled into an intermediate file format such as JTIF prior to being sent to instrumentation agent 110. In other embodiments, instrumentation agent 110 may be configured to receive the instrumentation program 125 in a high-level instrumentation language, and the instrumentation agent 110 may be configured to convert the instrumentation program 125 to executable code. In response to receiving the request, in some embodiments instrumentation agent 110 may be configured to authenticate the sender of the instrumentation request (block 410 of FIG. 4), e.g., to verify that the user has the appropriate permissions required for instrumentation. If the authentication is unsuccessful (e.g., the requesting user is not authorized to instrument the application 105) (as determined in decision block 415 of FIG. 4), the instrumentation agent 110 may be configured to reject the instrumentation request (block 450).

If the authentication is successful (as also determined in decision block 415 of FIG. 4), in some embodiments instrumentation agent 110 may be configured to make a determination whether the instrumentation code 145 included within, or derived from, the instrumentation request meets one or more acceptability criteria (block 420). A number of different acceptability criteria may be used in different embodiments, as describe above and also in conjunction with the description of FIG. 5 below. If the instrumented code is determined to be acceptable (as determined in decision block 425), the instrumentation agent 110 may be configured to insert the code at the probe point 135 while the application 105 is being executed within the targeted virtual machine 102 (block 430). For example, byte code instrumenter 205 may insert the instrumentation code 145 into a class of the application 105 prior to the class being loaded into memory for execution, or may insert the instrumentation code into an already loaded class. When the application execution reaches the probe point 135, the instrumentation code 145 may be executed, and the desired instrumentation results such as application state information may be obtained (block 435). The instrumentation results may be transmitted back to the requesting user, e.g., by displaying the results at a command-line or GUI interface of instrumentation client 120. On analyzing the instrumentation results, the user may wish to continue analysis, and may submit additional instrumentation programs 125. Operations corresponding to blocks 405, 420, 425, 430 and 435 may then be repeated for the new instrumentation programs, until the user completes the analysis of application 105. In some embodiments, the authentication of the instrumentation requester may be performed once during an analysis session, e.g., the first time a request from the user is received, and may not be repeated each time; in other embodiments, each instrumentation request may be authenticated.

If the instrumentation code 145 is found to be unacceptable (as also determined in decision block 425), in some embodiments the instrumentation agent 110 may be configured to provide an indication of unacceptability to the requester, e.g., in the form of one or more error messages identifying the reasons for unacceptability. In some embodiments, acceptability and/or correctness of the instrumentation program 125 may be checked at several levels in the instrumentation framework—e.g., by a compiler 220 at the instrumentation client 120, and also by a verifier 210 at instrumentation agent 110- and error messages indicating reasons why the instrumentation program was found unacceptable may be generated at the particular level where the error was found. It is noted that in some embodiments, acceptability verification operations (e.g., operations corresponding to blocks 420 and 425 of FIG. 4) may be omitted.

Figure 5:
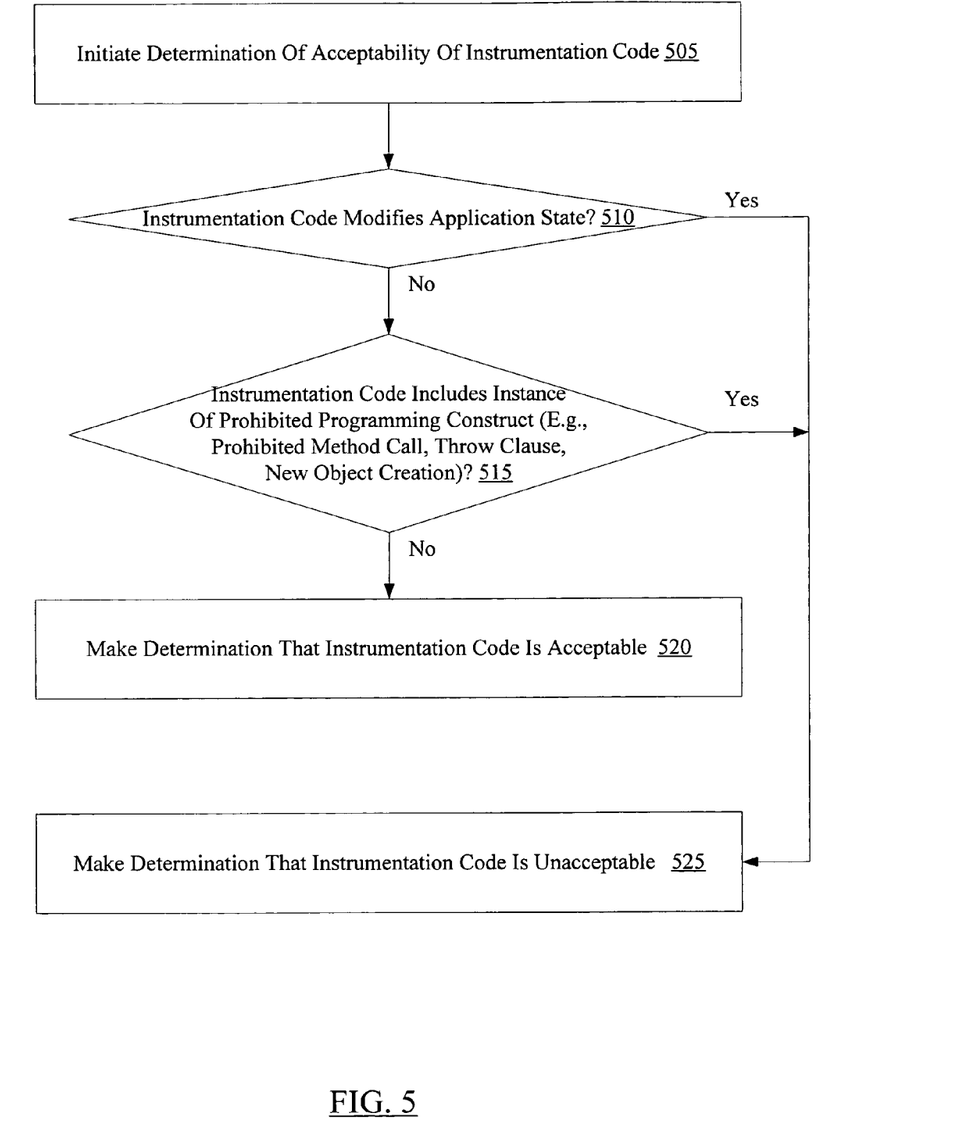
FIG. 5 is a flow diagram illustrating further aspects of the operation of an instrumentation agent during acceptability verification of an instrumentation program, according to one embodiment.

FIG. 5 is a flow diagram illustrating further aspects of the operation of instrumentation agent 110 during acceptability verification of an instrumentation program 125, according to one embodiment. In the depicted embodiment, the instrumentation agent 110 (or a subcomponent of the instrumentation agent 110 such as JTIF Verifier 210) may be configured to initiate a determination of the acceptability of the instrumentation code (block 505 of FIG. 5) on receiving the instrumentation code 145 as part of an instrumentation request. If the instrumentation code modifies the state of the application 105 targeted for implementation (as determined in decision block 510), e.g., if the instrumentation code changes a value of a variable defined in the application code, the instrumentation code 145 may be determined to be unacceptable (block 525). In addition, if the instrumentation code includes an instance of a prohibited programming language construct, such as a loop, a method call, an exception throw clause, a monitor operation, or a creation of a new object (as determined in decision block 515), the instrumentation code 145 may also be determined to be unacceptable. Otherwise, the instrumentation code may be determined to be acceptable (block 520). It is noted that the acceptability criteria may be configurable in some embodiments—e.g., a particular category of methods such as "get" methods that may be used to read field values, or a list of methods identified by name, may be specified as being acceptable in some embodiments. At least a portion of the acceptability checking may be performed at instrumentation client 120 in some embodiments, in addition to or instead of being performed at the instrumentation agent.

Figure 6:
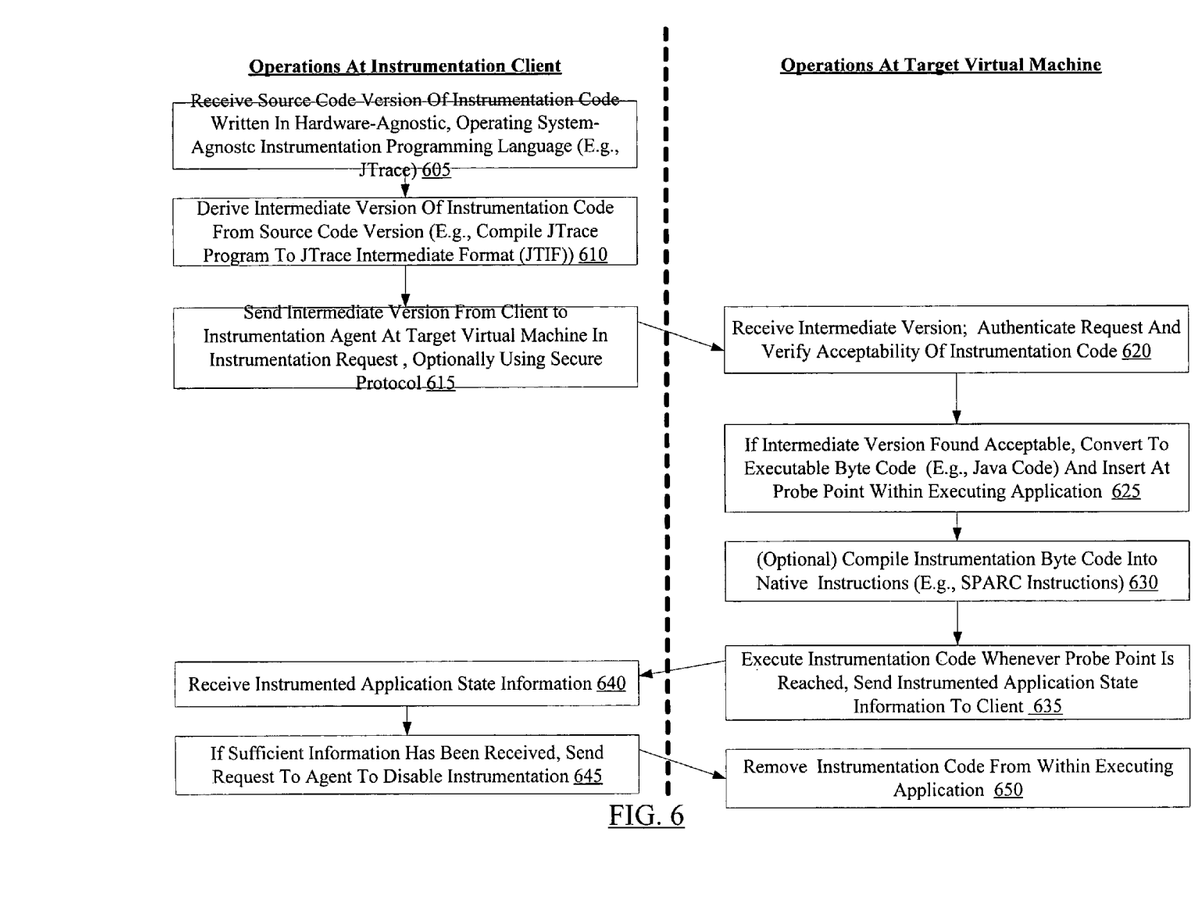
FIG. 6 is a flow diagram illustrating aspects of the operation of an instrumentation client and a virtual machine process targeted for instrumentation, according to one embodiment.

FIG. 6 is a flow diagram illustrating aspects of the operation of an instrumentation client 120 and a virtual machine process 102 targeted for instrumentation, according to one embodiment. The instrumentation client may be configured to receive as input a source code version of instrumentation code 145, written for example in a hardware-agnostic, operating system-agnostic instrumentation programming language such as JTrace (block 605 of FIG. 6). The input may be provided, for example, by a user who wishes to analyze the behavior of an application 105 using dynamic tracing, and may include an identification of the targeted virtual machine 102 and/or the application 105 to be instrumented. The instrumentation client 120 may be configured to derive an intermediate version of the instrumentation source code from the source code version, e.g., by compiling the source code version into an intermediate file format such as JTIF (block 610). As part of the conversion to the intermediate file format, the instrumentation client 120 may be configured to check for certain types of errors in the instrumentation code, such as syntax errors, and to notify the requesting user of the errors if any are found. The user may correct any errors and provide the corrected source code version of the instrumentation code to the instrumentation client 120, and this process may be repeated until no more errors detectable at compile time are found. The instrumentation client may then send the intermediate version to the targeted virtual machine 102 (block 615), e.g., to instrumentation agent 110, in the form of an instrumentation request. In some embodiments, a secure protocol (e.g., a protocol supporting Secure Sockets Layer (SSL) encryption) may be used to send the intermediate version to the target virtual machine.

On receiving the intermediate version of the instrumentation code 145, instrumentation agent 110 at the target virtual machine 102 may be configured to authenticate the request, e.g., by verifying that the requesting user or client is authorized to instrument the targeted application 105 and/or the target virtual machine 102. In some embodiments, the instrumentation request may include an identification of the requesting user, and the instrumentation agent may be configured to look up the authorization roles and/or privileges of the user in an authorization database. In one implementation, a user may have to log in to the instrumentation client interface prior to generating any instrumentation requests; in some such embodiments, the authorization privileges of the user may be obtained from an authorization database by the client and included with the instrumentation request. In addition to authenticating the instrumentation request, in some embodiments the instrumentation agent 110 may be configured to verify acceptability of the instrumentation code 145 (block 620 of FIG. 6) using the techniques described above.

If the intermediate version of the instrumentation code 145 is found to be acceptable, instrumentation agent 110 may be configured to convert the intermediate version into a final executable version (e.g., into Java™ byte code) and insert it at the designated probe point within the application 105, while the application is executing (block 625) within the target virtual machine. In some embodiments, the target virtual machine may be configured to identify long-running or frequently accessed code segments, and compile such code segments into native instructions for the hardware platform at which the virtual machine is running (such as SPARC™ instruction sets for hardware servers from Sun Microsystems), e.g., in order to further speed up execution of such code. In such embodiments, if the instrumentation code forms such a code segment (i.e., if the probe point is frequently accessed and/or if the instrumentation code 145 runs for sufficiently long periods of time), the instrumentation code may also optionally be compiled into native code (block 630).

After the application 105 has been instrumented, the instrumentation code 145 may be executed by the virtual machine 102 whenever the corresponding probe point 135 is reached during application execution (block 635). The results or output of the instrumentation may be sent to the requesting instrumentation client 120, e.g., using the same secure protocol that was used to send the instrumentation request from the client. The instrumentation client 120 may be configured to receive the instrumentation results (block 640) and pass them on to the user. The user may analyze the results and make a determination whether additional instrumentation is needed, using either the same instrumentation program 125 that was used before or a modified or new instrumentation program 125. The instrumentation techniques described above may be used to progressively narrow down the cause of the perceived problem in the application execution (such as a slowdown or unexpected results), e.g., using more specific instrumentation during each analysis iteration. When sufficient information has been obtained from the instrumentation, the user may indicate to the instrumentation client 120 that instrumentation is no longer needed in some embodiments, and the instrumentation client 120 may send a request to the instrumentation agent 110 to terminate the instrumentation (block 645). On receiving the termination request, instrumentation agent 110 may be configured to disable further instrumentation of the application 105, e.g., by removing the previously inserted instrumentation code 145 (block 650) from the running application, without requiring the application or the virtual machine to be stopped or restarted, and without changing runtime environment settings.

In some embodiments, libraries of instrumentation programs 125 may be maintained, in source code format and/or in intermediate file format, and may be reused and/or shared by various users at different virtual machines and on different hardware platforms. In some embodiments the instrumentation code, in either source code format, intermediate file format or both, may be used without modification at any virtual machine 102 that supports agent 110, and hence may not require to be ported for use at different hardware platforms. In one such embodiment, for example, the same set of JTrace scripts 125 may be used from a single client 120 to debug and/or perform performance troubleshooting on two or more different target virtual machines 102, where at least one of the target virtual machines 102 is executed on a different hardware and operating system platform than a second target virtual machine 102.

Figure 7:
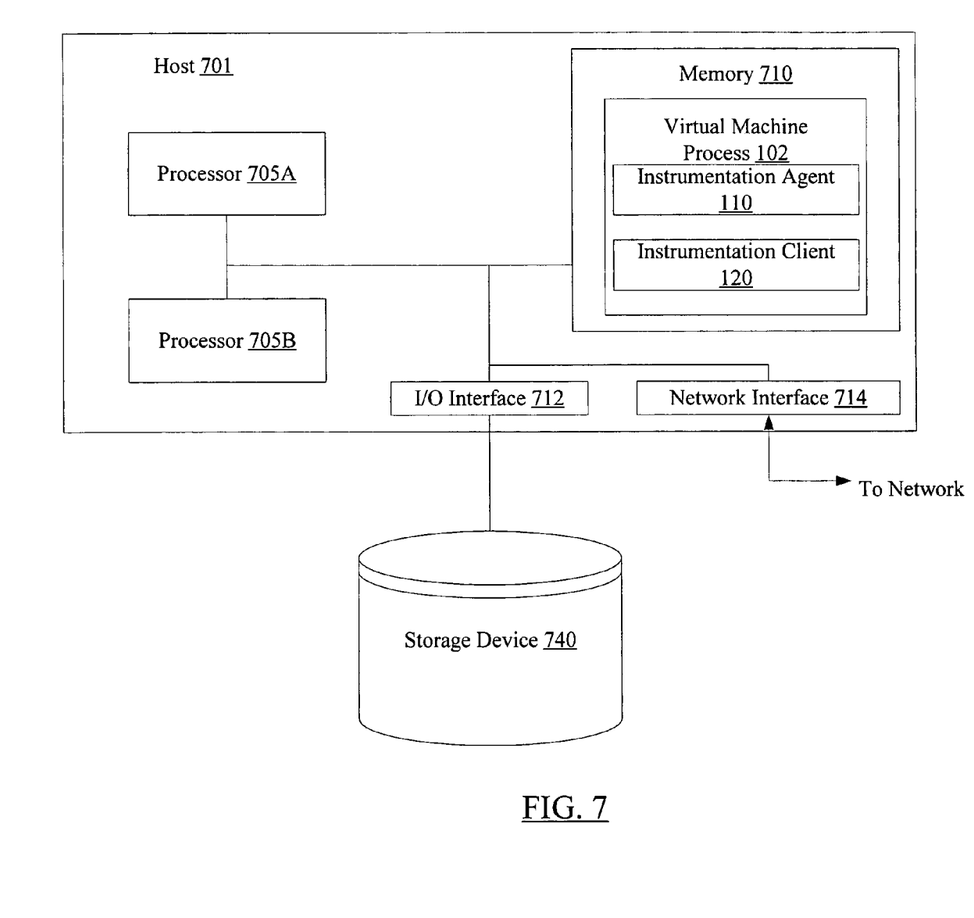
FIG. 7 is a block diagram illustrating a computer host according to one embodiment.

FIG. 7 is a block diagram of a computer host 701 according to one embodiment. As shown host 701 may include one or more processors 705, such as processors 705A and 705B. In various embodiments, processors 705 may be implemented using any desired architecture or chip set, such as the SPARC™ architecture from Sun Microsystems or the x86-compatible architectures from Intel Corporation, Advanced Micro Devices, etc. Program instructions that may be executable to implement the functionality of virtual machines 102, including instrumentation agent 110 and instrumentation client 120, may be partly or fully resident within a memory 710 at a given point in time, and may also be stored on a storage device 740. It is noted that while in the embodiment illustrated in FIG. 7, instrumentation agent 110 and instrumentation client 120 are shown within a single virtual machine process 102, in other embodiments instrumentation agent 110 and instrumentation client 120 may each be included in a respective (i.e., different) virtual machine process 102. In various embodiments, instrumentation client 120 and/or instrumentation agent 110 may be packaged as a standalone application, or may be packaged along with an application server or included within a suite of software tools. Memory 710 may be implemented using any appropriate medium such as any of various types of RAM (e.g., DRAM, SDRAM, RDRAM, SRAM, etc.). In addition to processors 705 and memory 710, host 701 may also include one or more I/O interfaces 712 providing access to storage devices 740, one or more network interfaces 714 providing access to a network, and the like. Any of a variety of storage devices may be used to store the instructions as well as data for virtual machines 102 in different embodiments, include any desired type of persistent and/or volatile storage devices, such as individual disks, disk arrays, optical devices such as CD-ROMs, CD-RW drives, DVD-ROMs, DVD-RW drives, flash memory devices, various types of RAM and the like.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
   starting execution of an application, including loading and executing a portion of code of the application, wherein the application is written in a platform-independent programming language supporting a plurality of programming constructs;
   subsequent to loading the portion of code and while the application is executing:
      receiving an instrumentation request comprising an identification of a probe point of the loaded portion of code at which instrumentation code is to be inserted;
      inserting the instrumentation code at the probe point while the application is being executed within a first virtual machine process and the portion of code is loaded, wherein the instrumentation code is verified to meet one or more of the following acceptance criteria: (a) that the instrumentation code does not modify a state of the application, or (b) that the instrumentation code does not include an instance of a programming construct from a set of prohibited programming constructs; and
      obtaining information indicative of an application state from an execution of the instrumentation code when the probe point is reached during application execution.

2. The method as recited in claim 1, wherein the instrumentation code includes code derived from a user-generated instrumentation script written in an instrumentation programming language.

3. The method as recited in claim 1, further comprising:
   receiving a source code version of the instrumentation code, wherein the source code is written in a hardware-agnostic and operating-system-agnostic instrumentation programming language; and deriving an intermediate version of the instrumentation code from the source code version; and deriving an executable version of the instrumentation code for insertion into the application from the intermediate version.

4. The method as recited in claim 3, wherein the intermediate version of the instrumentation code is derived from the source code version within a second virtual machine process.

5. The method as recited in claim 1, wherein the application program is written in a platform-independent programming language supporting a plurality of programming constructs, wherein the identification of the probe point comprises at least one of: a name of a particular instance of a programming construct of the plurality of programming constructs, a line number within source code corresponding to the application, and a metadata annotation within source code corresponding to the application.

6. The method as provided in claim 1, wherein identification of the probe point includes a name of a logical operation performed by the application, further comprising:

translating the name of the logical operation to a location of an instruction within an executable version of the application, wherein an execution of the instruction corresponds to an initiation of the logical operation.

7. The method as provided in claim 1, wherein said inserting comprises at least one of: (a) loading a modified version of an executable application class for execution in the virtual machine and (b) modifying an executable application class that has already been loaded for execution in the virtual machine.

8. The method as recited in claim 1, further comprising:

compiling the instrumentation code into native instructions compatible with a hardware platform at which the virtual machine is being executed.

9. The method as recited in claim 1, further comprising:

in response to a request to disable instrumentation, removing the instrumentation code from the application while the application is being executed within the first virtual machine process.

10. The method as recited in claim 1, wherein the instrumentation request is received from an instrumentation client, further comprising:

authenticating the instrumentation client.

11. The method as recited in claim 1, wherein the information indicative of the application state includes a state of an instance of a programming construct of the plurality of programming constructs.

12. A non-transitory computer readable medium comprising program instructions, wherein the instructions are computer-executable to:

receive an instrumentation request comprising an identification of a probe point at which instrumentation code is to be inserted within an application, wherein the application is executing and the probe point is in a section of code of the application that has already been previously loaded, wherein the application is written in a platform-independent programming language supporting a plurality of programming constructs;

insert the instrumentation code at the probe point within the application while the application is being executed within a first virtual machine process and the portion of code is loaded, wherein the instrumentation code is verified to meet one or more of the following acceptance criteria: (a) that the instrumentation code does not modify a state of the application, or (b) that the instrumentation code does not include an instance of a programming construct from a set of prohibited programming constructs; and obtain information indicative of an application state from an execution of the instrumentation code when the probe point is reached during application execution.

13. The non-transitory computer readable medium as recited in claim 12, wherein the instrumentation code includes code derived from a user-generated instrumentation script written in a platform-independent instrumentation programming language.

14. The non-transitory computer readable medium as recited in claim 12, wherein the instructions are further computer-executable to:

verify that the instrumentation code meets one or more acceptance criteria prior to inserting the instrumentation code at the probe point, wherein said verifying comprises determining that the instrumentation code (a) does not modify a state of the application and (b) does not include an instance of a programming construct from a set of prohibited programming constructs.

15. The non-transitory computer readable medium as recited in claim 12, wherein the identification of the probe point includes a name of a logical operation performed by the application, wherein the instructions are further computer-executable to:

translate the name of the logical operation to a location of an instruction within an executable version of the application, wherein an execution of the instruction corresponds to an initiation of the logical operation.

16. A system, comprising:

a processor; and a memory coupled to the processor and configured to store program instructions executable by the processor to:

receive an instrumentation request comprising an identification of a probe point at which instrumentation code is to be inserted within an application, wherein the application is executing and the probe point is in a section of code of the application that has been previously loaded, wherein the application is written in a platform-independent programming language supporting a plurality of programming constructs;

insert the instrumentation code at the probe point within the application while the application is being executed within a first virtual machine process and the portion of code is loaded, wherein the instrumentation code is verified to meet one or more of the following acceptance criteria: (a) that the instrumentation code does not modify a state of the application, or (b) that the instrumentation code does not include an instance of a programming construct from a set of prohibited programming constructs; and obtain information indicative of an application state from an execution of the instrumentation code when the probe point is reached during application execution.

17. The system as recited in claim 16, wherein the instrumentation code includes code derived from a user-generated instrumentation script written in a platform-independent instrumentation programming language.

18. The system as recited in claim 16, the instructions are further executable to:

verify that the instrumentation code meets one or more acceptance criteria prior to inserting the instrumentation code at the probe point, wherein said verifying comprises determining that the instrumentation code (a) does not modify a state of the application and (b) does not include an instance of a programming construct from a set of prohibited programming constructs.

19. The system as recited in claim 16, wherein the identification of the probe point includes a name of a logical operation performed by the application, wherein the instructions are further executable to:

translate the name of the logical operation to a location of an instruction within an executable version of the application, wherein an execution of the instruction corresponds to an initiation of the logical operation.

* * * * *